United States Patent
Jetzt

(10) Patent No.: US 6,956,462 B2
(45) Date of Patent: Oct. 18, 2005

(54) METHODS AND DEVICES FOR PROVIDING POWER TO NETWORK-BASED SYSTEMS

(75) Inventor: John J. Jetzt, Lincroft, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 644 days.

(21) Appl. No.: 10/004,830

(22) Filed: Dec. 7, 2001

(65) Prior Publication Data

US 2003/0107269 A1 Jun. 12, 2003

(51) Int. Cl.$^7$ ............................................. H04M 11/04
(52) U.S. Cl. ...................... 340/310.01; 340/310.06; 340/693.1; 340/693.4; 379/413; 379/413.02; 700/295; 700/297; 713/300
(58) Field of Search ................... 340/310.02, 310.06, 340/855.8, 855.9, 693.1, 693.3, 693.4, 333, 425.2, 310.01, 286.02, 292; 700/17, 295, 296, 297; 379/93.06, 900, 413, 413.01, 413.02, 395, 163, 164, 377, 395.01; 370/248, 251, 465, 352, 389; 713/300; 725/131

(56) References Cited

U.S. PATENT DOCUMENTS

| 4,803,718 | A | * | 2/1989 | Neil et al. .................. 379/163 |
| 5,255,086 | A | * | 10/1993 | McMullan, Jr. et al. .... 725/131 |
| 6,459,275 | B1 | * | 10/2002 | Ewalt et al. ................ 324/539 |
| 6,546,494 | B1 | * | 4/2003 | Jackson et al. ............. 713/300 |
| 6,650,635 | B1 | * | 11/2003 | Weinstein et al. .......... 370/352 |

* cited by examiner

Primary Examiner—Davetta W. Goins
(74) Attorney, Agent, or Firm—Ryan, Mason & Lewis, LLP

(57) ABSTRACT

Circuits provide power to network-based devices, such as IP telephones, using spare conductors within existing LAN cables. The circuits, which may comprise diode bridges, are designed to provide power using existing and planned industry guidelines.

69 Claims, 2 Drawing Sheets

METHODS AND DEVICES FOR PROVIDING POWER TO NETWORK-BASED SYSTEMS

BACKGROUND OF THE INVENTION

It used to be that the network which controlled your telephone was different than the network which controlled your computer. In the not-too-distant future, these two networks will become one. For example, so-called "IP telephones" (short for "Internet-Protocol telephones") will be able to function much like conventional telephones, albeit using unconventional means. That is, IP telephones and other network-based systems will be connected to a network capable of sending and receiving both voice, data and other signals (i.e., video) as Internet-Protocol signals.

Separate from the type of information these systems will handle is the issue of how to provide power to them.

One way to provide power is to use an electrical outlet. This connects a system to the electric company's power grid. A second method is to provide power using the same physical conductors (e.g., wires) which handle voice or data information. That is, power supplied by the network itself. This is a more traditional method.

Additional methods have also been proposed, all of which use conductors within a network cable which is used to connect a system (e.g., IP telephone,) to the network.

For example, a conventional "local area network" ("LAN") cable which connects an IP telephone to a network contains eight wires. Of the eight wires, four are typically used to transmit and receive voice and data information. These four may also be used to supply power if power is to be supplied over the same wires (i.e., the second method mentioned above) which are providing voice and data information. As is known in the art, this is not always the best way to provide power. Many times it is too complicated to place power on the same wires as data and still preserve the integrity of the data.

Alternatively, the remaining four extra or spare wires may be used to supply power only.

Specifically, a third method suggests that network-based systems be powered by placing two signals (e.g., voltages) each of opposite polarity (e.g., +V, −V) on two of the remaining four wires. This method is referred to as a "differential mode" or "differential voltage" technique via one pair.

The fourth suggested method uses all four of the remaining wires. In this method the same nominal voltage, (i.e., either +V or −V) is placed on two of the remaining wires while a second nominal voltage of opposite polarity is placed on the remaining pair of wires. This method is referred to as a "common mode" or "common voltage" technique via two pairs.

Some network-based systems or devices (hereafter collectively referred to as "network-based device") have been developed which are adapted to be powered using the third method mentioned above. Other network-based devices are being developed which can only be powered using the fourth method just discussed.

It is desirable, however, to provide network-based devices which are capable of operating when power is supplied using either method.

Other desires will become apparent from the drawings, detailed description of the invention and claims which follow.

SUMMARY OF THE INVENTION

In accordance with the present invention, devices (and corresponding methods) which provide power to network-based devices comprise: a first circuit (e.g., a diode bridge made from an integrated circuit or discrete devices) adapted to provide a differential voltage based on input signals of opposite polarity received from a first pair of network pathways (e.g., two of the spare LAN cable wires) or may be used to contribute to the provisioning of a common voltage based on input signals of a first polarity received from the first pair of pathways; and a second circuit adapted to supply the differential voltage based on input signals of opposite polarity received from a second pair of network pathways (e.g., the other pair of spare LAN cable wires) or to contribute to the provisioning of the common voltage based on input signals of a second polarity received from the second pair of pathways.

These two circuits may be combined with two additional circuits, one that supplies local power and one that provides both power and communications signals (e.g., voice, data) via other network pathways. Together, such a device provides the ability to power network-based devices (e.g., IP telephones and the like) using existing and planned industry guidelines.

BRIEF DESCRIPTION OF THE INVENTION

DETAILED DESCRIPTION OF THE INVENTION

Figure 1:
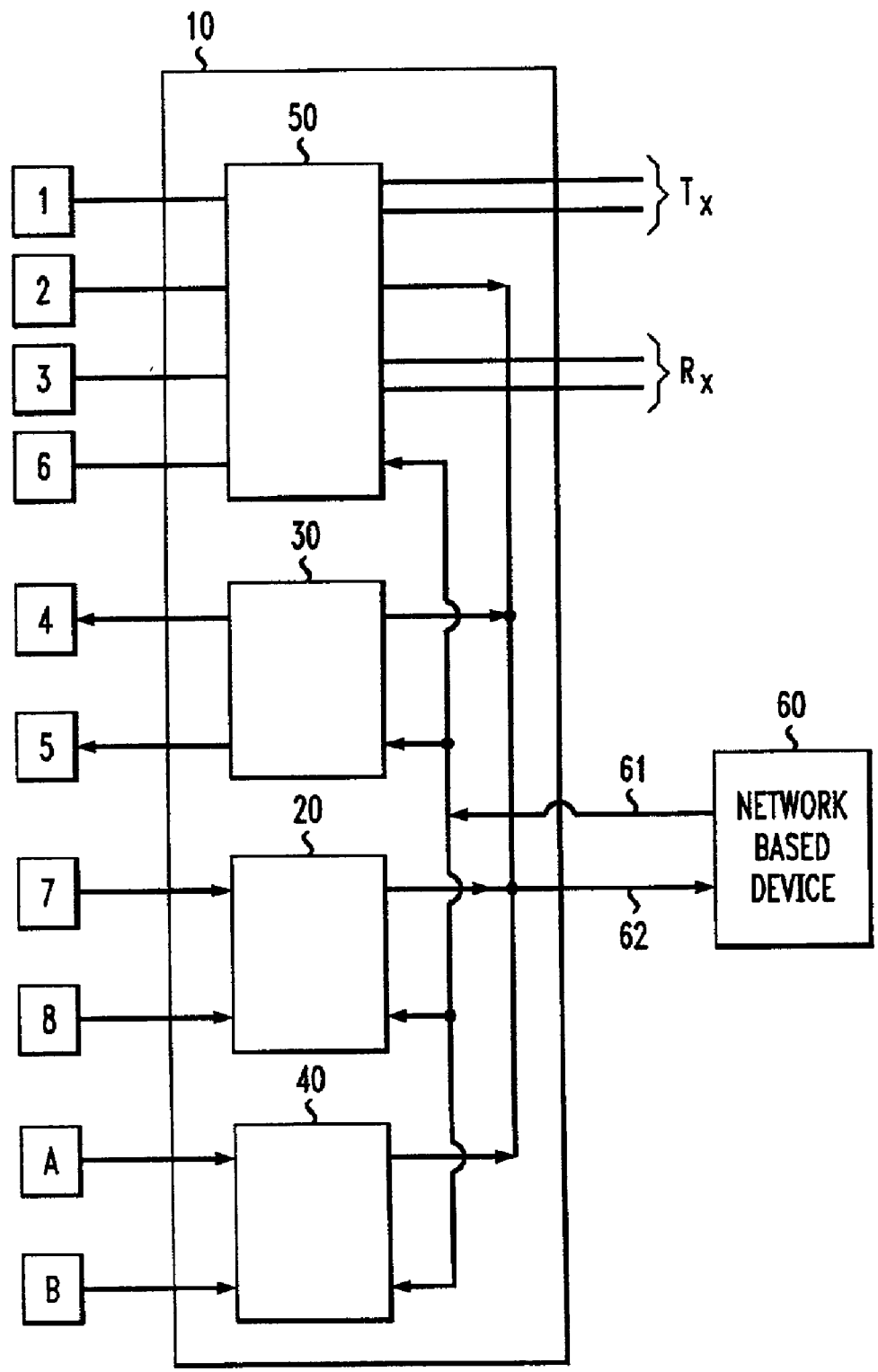
FIG. 1 depicts a technique for providing power to a network-based device, such as an IP telephone, according to one embodiment of the present invention.

Referring to FIG. 1, there is shown a device 10 for providing power to a network-based device 60 according to one embodiment of the present invention. The device 60 may comprise any number of devices which are commonly connected to a network, (e.g., LANs), such as an IP-telephone or a computer.

As shown, the device 10 comprises four circuits, 20,30,40 and 50. For the sake of clarity, they will be referred to as a first circuit 20, second circuit 30, third circuit 40 and fourth circuit 50, respectively. All four circuits are designed to provide power to the system 60 via pathways 61 and 62.

According to one embodiment of the present invention, the third circuit 40 is adapted to provide "local power" to the network device 60 (e.g., from a wall unit connected to an electrical outlet or the like). The letters "A" and "B" indicate inputs into the third circuit 40. These inputs may take the form of terminals and/or pathways (e.g., an electrical cord). The fourth circuit 50 is the type of circuit which is adapted to provide both power and communication signals to the device 60. Both power and communication signals (e.g., voice and data signals) may be input into, and output from, network pathways labeled 1,2,3 and 6. As with the third circuit 40, these pathways may comprise terminals or wires. For example, pathways 1,2,3 and 6 may be directly connected onto the surface of a printed circuit board within circuit 50 or, alternatively, may comprise a terminal strip where the network pathways 1,2,3 and 6 "terminate" (i.e., are fastened to . . . ) on one side of the strip. In this instance, other pathways (e.g., wires, conductors) connect the other side of the strip to the circuit 50. Unlike the third circuit 40, however, the pathways 1,2,3 and 6 are network pathways. That is, these pathways are connected to a communications network (not shown) while pathways A and B are local power pathways. They are connected to the local power grid, not to the communications network. Though uncommon, one company may provide both the communications network and power grid to a user of device 10.

It should be noted that the direction that the communication signals are moving is relative. That is, instead of receiving signals via pathways 3,6 and transmitting signals via pathways 1,2 each direction may easily be reversed. Similarly, when these pathways are used to provide power the polarities of pathways 1,2 and 3,6 may also be reversed.

We turn our attention now to the first and second circuits 20,30. Before doing so, it should be understood that the functions described below with respect to the first circuit 20 may, alternatively, be carried out by the second circuit 30 and vice-versa. That is, the functions carried out by the first and second circuits 20,30 are interchangeable.

A user of device 10 may designate pathways 7,8 as the first circuit and pathways 4,5 as the second circuit or vice versa. Pathways 4,5 and 7,8 are sometimes referred to as "spare" pathways because they typically go unused. For example, in a conventional network cable, which contains eight wires, wires 4,5,7, and 8 will not be used. Realizing this, some network-based devices are designed to receive power via pathways 7,8. The term "auxiliary power" is sometimes used to describe the provisioning of power in this manner. In one example of the present invention, pathway 7 comprises a signal whose polarity is different than (i.e., opposite of) the polarity of a signal received via pathway 8. For example, the signal received along pathway 7 may be of a negative polarity while the signal received via pathway 8 may be of a positive polarity, or vice versa. In another embodiment, the signals typically input into pathways 7,8 may be input into pathways 4,5 leading to the second circuit 30. As indicated once before, this technique is known as a differential method via one pair of providing power to the network-based device 60. Typically, the presence of two signals of opposite polarity at pathways 7,8 will result in a voltage (sometimes referred to as a "potential") being generated by the first circuit 20. For clarity sake, we will refer to this voltage as a "differential voltage".

It can be said that either the first or second circuits 20,30 can be adapted to supply a differential voltage to the network device 60 based on input signals of different polarities received via a pair of network pathways (either 7,8 or 4,5). To distinguish pathways 7,8 from 4,5 we will refer to pathways 7,8 as a "first" pair of pathways and pathways 4,5 as a "second" pair of pathways.

Recently, various industry associations have recommended another technique for providing power to network-based devices. For example, the "IEEE802.3af DTE Power MDI" task force is working on an amendment to a standard known as "IEEE802.3". The amendment will specify power over Ethernet networks. This technique requires two pairs of pathways where each pair is adapted to transmit a signal of the same polarity. That is, this technique requires that the signal input into the first circuit 20 via pathways 7,8 be of the same polarity (either a positive + or a negative −polarity). The same for pathways 4,5. For example, a signal having a negative polarity is input into device 60 via pathways 7,8 while a signal having a positive polarity is input into device 60 via pathways 4,5.

Existing network-based devices are not adapted to operate using both techniques. Some are adapted to operate when the signals provided to a single pair of pathways are of opposite polarity while others are adapted to operate when the signals applied to two pairs of terminals are of the same polarity (e.g., −V on pathway 4,5 and +V on pathway 7,8). None are adapted to operate using both techniques. Devices, such as device 10, envisioned by the present invention are adapted to provide this capability to network-based devices.

In one embodiment of the present invention, the first circuit 20 may be adapted to receive input signals via pathways 7,8 which are of the same "first" polarity (e.g., positive) while the second circuit 30 is adapted to receive signals via pathways 4,5 which are also of a same "second" polarity (e.g., negative). In this manner, both the first and second circuits 20,30 are used to generate a voltage which is used to power device 60. The voltage generated by both the first and second circuits 20,30 is referred to as a "common voltage" to distinguish it from the differential voltage mentioned above.

Because both circuits 20,30 are used in generating the common voltage, it can be said that first and second circuits 20,30 are both adapted to contribute to the generation and provisioning (collectively "provisioning") of the common voltage to the device 60.

For ease of clarification later, as indicated above the polarity of the signals received by the first pair of pathways 7,8 will be referred to as a first polarity while the polarity of the signals received by the second pair of pathways 4,5 will be referred to as a second polarity. The polarity of the pairs of pathways may be reversed. That is, either pathways 7,8 or 4,5 may be positive or negative provided each pair of pathways are of opposite polarity.

Figure 2:
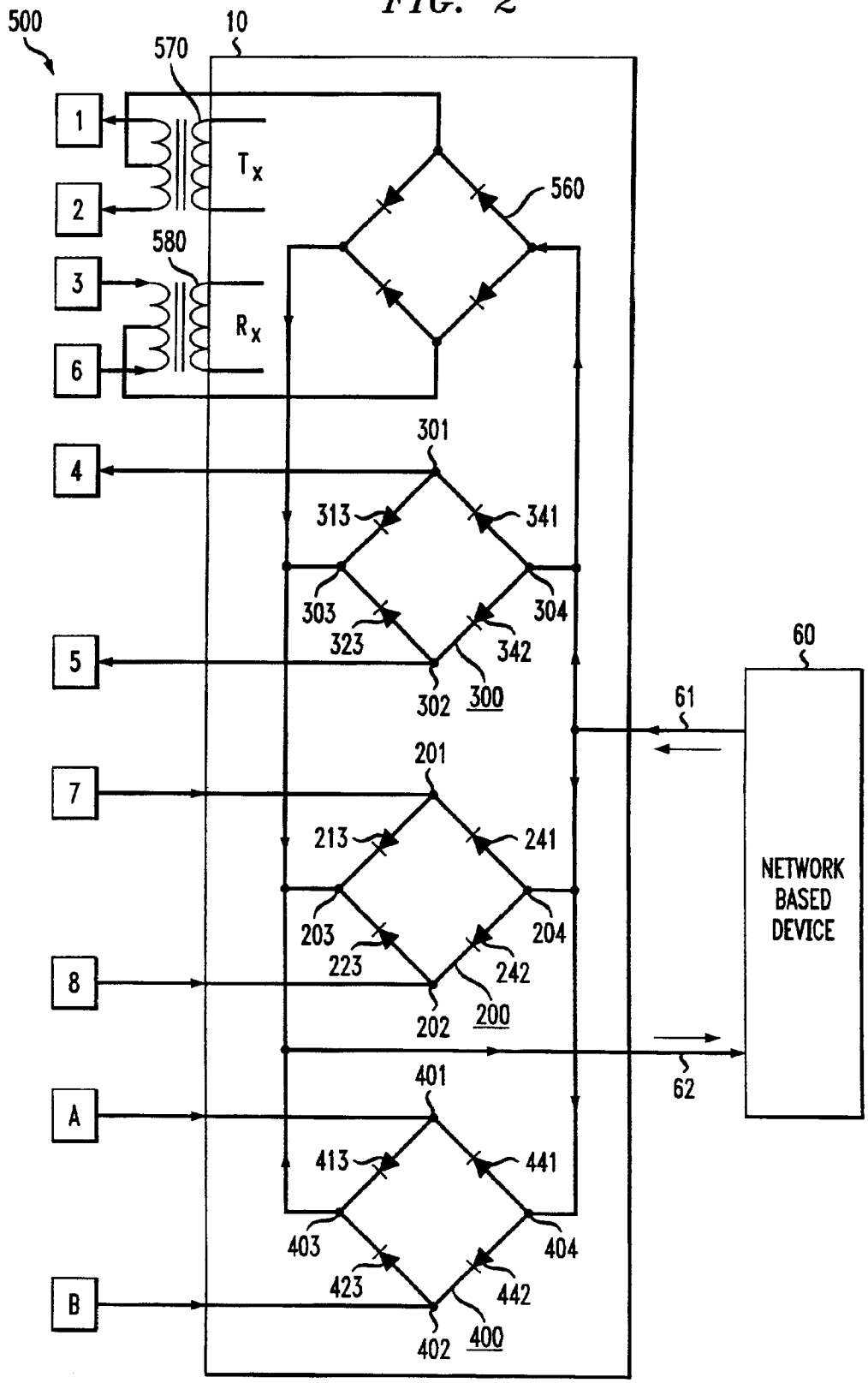
FIG. 2 depicts a technique for providing power to a network-based device, such as an IP-telephone, according to another embodiment of the present invention.

Referring now to FIG. 2, there is shown first through fourth circuits 200–500 comprising bridge circuits, or more specifically, diode bridges. It should be understood that although FIG. 2 might illustrate the most common way of representing the first through fourth circuits, it is not the only way. The first through fourth circuits may comprise any number of combinations of discrete, integrated or solid state circuits which are adapted to carry out the functions and features of the first through fourth circuits described above and below.

In greater detail, each diode bridge 200–500 has two input nodes (e.g., 401 and 402 in bridge 400) and two output nodes (e.g., 403 and 404). Each input-output-node combination is connected through a diode (e.g., 413, 423, 442 and 441 in bridge 400). Each diode conducts electricity (i.e., sends a signal) in only one direction. One end of each diode is referred to as "P" (for "positive"), while the other is referred to as "N" (for "negative"). The P end of each diode is the "tail" of the arrow which symbolizes a diode and "N" is the point of the arrow. Each diode conducts a signal when the node connected to P is positive with respect to the node connected to N. Conversely, no signal is conducted when the node connected to P is negative with respect to the node connected to N. In the embodiment shown in FIG. 2, each diode conducts an electrical current in the direction indicated by the arrow.

We will discuss the use of a differential voltage first, followed by a discussion of the use of a common voltage. In an illustrative embodiment of the invention, when a differential voltage is applied to the input nodes 301,302 of bridge 300, signals are conducted as follows. When node 301 is positive with respect to node 302 and a network device 60 is connected to nodes 303,304, diodes 313 and 342 conduct while diodes 341 and 323 do not. This results in a positive signal being brought to an input of device 60.

If, however, node 302 is positive with respect to node 301, diodes 323 and 341 conduct, while diodes 342 and 313 do not. This scenario again results in a positive signal being brought to an input of device 60.

On the other hand, when a common voltage is applied to input nodes 201, 202 of bridge 200 and a common voltage of an opposite polarity is applied to input nodes 301, 302 where nodes 203,204 are connected to nodes 303,304, signals are conducted as follows. When nodes 201,202 are positive with respect to nodes 301,302, diodes 213, 223,341, and 342 conduct while diodes 241,242,313 and 323 do not. The end result being that a positive signal is again brought to an input of device 60.

Finally, if nodes 301,302 are positive with respect to nodes 201,202, diodes 313, 323, 241 and 242 conduct while the remaining diodes do not, once again resulting in a positive signal being brought to an input of device 60. From FIG. 2 it can also be seen that the fourth circuit 500, in addition to comprising a diode bridge 560, may also comprise transformers 570 and 580 which pass communication signals to outputs "Tx" and "Rx". As shown, it is the centertaps of the primaries of transformers 570 and 580 which pass to the power bridge 560.

In sum, because both the first and second circuits 200,300 are adapted to provide power by generating either a differential voltage or a common voltage, it can be said that devices which make use of first and second circuits envisioned by the present invention are capable of being supplied with power using either a differential or common mode technique.

The above discussion is intended to provide some examples of the features and functions of the present invention. It should be understood however, that variations may be made to the examples above without departing from the spirit and scope of the present invention. For example, though device 10 is shown comprising all four circuits this may not be the case. Alternative devices may only comprise first and second circuits or some combination of all four circuits. The true scope of the present invention is defined by the claims which follow.

I claim:

1. A device for providing power to a network-based device comprising:
   a first circuit adapted in a first mode of operation to provide a differential voltage based on input signals of opposite polarity received from a first pair of network pathways and in a second mode of operation to contribute to the provisioning of a common voltage based on input signals of a first polarity received from the first pair of pathways; and
   a second circuit adapted in a first mode of operation to supply the differential voltage based on input signals of opposite polarity received from a second pair of network pathways and in a second mode of operation to contribute to the provisioning of the common voltage based on input signals of a second polarity received from the second pair of pathways.

2. The device as in claim 1 wherein the first and second circuits comprise discrete devices.

3. The device as in claim 1 wherein the first and second circuits comprise integrated circuits.

4. The device as in claim 1 wherein the first and second circuits comprise diode bridges.

5. The device as in claim 1 further comprising a third circuit adapted to supply local power.

6. The device as in claim 5 wherein the local power comprises AC power.

7. The device as in claim 1 further comprising a fourth circuit adapted to provide power and communication signals from additional network pathways.

8. The device as in claim 7 wherein the communication signals comprise voice signals.

9. The device as in claim 7 wherein the communication signals comprise data signals.

10. The device as in claim 1 wherein the first polarity is a positive polarity and the second polarity is a negative polarity.

11. The device as in claim 1 wherein the first polarity is a negative polarity and the second polarity is a positive polarity.

12. The device as in claim 1 wherein the first and second pathways comprise LAN cable wires.

13. The device as in claim 1 wherein the first and second pathways comprise terminal connections.

14. A network-based device comprising:
   a first circuit adapted in a first mode of operation to provide a differential voltage based on input signals of opposite polarity received from a first pair of network pathways and in a second mode of operation to contribute to the provisioning of a common voltage based on input signals of a first polarity received from the first pair of pathways; and
   a second circuit adapted in a first mode of operation to supply the differential voltage based on input signals of opposite polarity received from a second pair of network pathways and in a second mode of operation to contribute to the supply of the common voltage based on input signals of a second polarity received from the second pair of pathways.

15. The network-based device as in claim 14 wherein the first and second circuits comprise discrete devices.

16. The network-based device as in claim 14 wherein the first and second circuits comprise integrated circuits.

17. The network-based device as in claim 14 wherein the first and second circuits comprise solid state devices.

18. The network-based device as in claim 14 wherein the first and second circuits comprise diode bridges.

19. The network-based device as in claim 14 further comprising a third circuit adapted to provide local power.

20. The network-based device as in claim 19 wherein the local power comprises AC power.

21. The network-based device as in claim 14 further comprising a fourth circuit adapted to provide power and communication signals from additional network pathways.

22. The network-based device as in claim 21 wherein the communication signals comprise voice signals.

23. The network-based device as in claim 21 wherein the communication signals comprise data signals.

24. The network-based device as in claim 14 wherein the first polarity is a positive polarity and the second polarity is a negative polarity.

25. The network-based device as in claim 14 wherein the first polarity is a negative polarity and the second polarity is a positive polarity.

26. The network-based device as in claim 14 wherein the first and second pathways comprise LAN cable wires.

27. The network-based device as in claim 14 wherein the first and second pathways comprise terminal connections.

28. The network-based device as in claim 14 wherein the device comprises a computer.

29. The network-based device as in claim 14 wherein the device comprises an IP telephone.

30. A method for providing power comprising:
    providing in a first mode of operation of a first circuit a differential voltage based on input signals of opposite polarity received from a first pair of network pathways and in a second mode of operation of the first circuit contributing to the provisioning of a common voltage based on input signals of a first polarity received from the first pair of pathways; and
    providing in a first mode of operation of a second circuit the differential voltage based on input signals of opposite polarity received from a second pair of network pathways and in a second mode of operation of the second circuit contributing to the provisioning of the common voltage based on input signals of a second polarity received from the second pair of pathways.

31. The method as in claim 30 further comprising providing local power.

32. The method as in claim 31 wherein local power comprises AC power.

33. The method as in claim 30 further comprising providing power and communication signals from additional network pathways.

34. The method as in claim 33 wherein the communication signals comprise voice signals.

35. The method as in claim 33 wherein the communication signals comprise data signals.

36. The method as in claim 30 wherein the first polarity is a positive polarity and the second polarity is a negative polarity.

37. The method as in claim 30 wherein the first polarity is a negative polarity and the second polarity is a positive polarity.

38. The method as in claim 30 wherein the first and second pathways comprise LAN cable wires.

39. The method as in claim 30 wherein the first and second pathways comprise terminal connections.

40. A device for providing power to a network-based device comprising:
    a first circuit adapted in a first mode of operation to provide a differential voltage based on input signals of opposite polarity received from a first pair of network pathways and in a second mode of operation to contribute to the provisioning of a common voltage based on input signals of a first polarity received from the first pair of pathways;
    a second circuit adapted in a first mode of operation to supply the differential voltage based on input signals of opposite polarity received from a second pair of network pathways and in a second mode of operation to contribute to the provisioning of the common voltage based on input signals of a second polarity received from the second pair of pathways;
    a third circuit adapted to supply local power; and
    a fourth circuit adapted to provide power and communication signals from additional network pathways.

41. The device as in claim 40 wherein the first and second circuits comprise discrete devices.

42. The device as in claim 40 wherein the first and second circuits comprise integrated circuits.

43. The device as in claim 40 wherein the first and second circuits comprise diode bridges.

44. The device as in claim 40 wherein the local power comprises AC power.

45. The device as in claim 40 wherein the communication signals comprise voice signals.

46. The device as in claim 40 wherein the communication signals comprise data signals.

47. The device as in claim 40 wherein the first polarity is a positive polarity and the second polarity is a negative polarity.

48. The device as in claim 40 wherein the first polarity is a negative polarity and the second polarity is a positive polarity.

49. The device as in claim 40 wherein the first, second and additional pathways comprise LAN cable wires.

50. The device as in claim 40 wherein the first, second and additional pathways comprise terminal connections.

51. A network-based device comprising:
    a first circuit adapted in a first mode of operation to provide a differential voltage based on input signals of opposite polarity received from a first pair of network pathways and in a second mode of operation to contribute to the provisioning of a common voltage based on input signals of a first polarity received from the first pair of pathways;
    a second circuit adapted in a first mode of operation to supply the differential voltage based on input signals of opposite polarity received from a second pair of network pathways and in a second mode of operation to contribute to the provisioning of the common voltage based on input signals of a second polarity received from the second pair of pathways;
    a third circuit adapted to supply local power; and
    a fourth circuit adapted to provide power and communication signals from additional network pathways.

52. The network-based device as in claim 51 wherein the first and second circuits comprise discrete devices.

53. The network-based device as in claim 51 wherein the first and second circuits comprise integrated circuits.

54. The network-based device as in claim 51 wherein the first and second circuits comprise diode bridges.

55. The network-based device as in claim 51 wherein the local power comprises AC power.

56. The network-based device as in claim 51 wherein the communication signals comprise voice signals.

57. The network-based device as in claim 51 wherein the communication signals comprise data signals.

58. The network-based device as in claim 51 wherein the first polarity is a positive polarity and the second polarity is a negative polarity.

59. The network-based device as in claim 51 wherein the first polarity is a negative polarity and the second polarity is a positive polarity.

60. The network-based device as in claim 51 wherein the first, second and additional pathways comprise LAN cable wires.

61. The network-based device as in claim 51 wherein the first, second and additional pathways comprise terminal connections.

62. A method for providing power comprising:

providing in a first mode of operation of a first circuit a differential voltage based on input signals of opposite polarity received from a first pair of network pathways and in a second mode of operation of the first circuit contributing to the provisioning of a common voltage based on input signals of a first polarity received from the first pair of pathways;

supplying in a first mode of operation of the second circuit the differential voltage based on input signals of opposite polarity received from a second pair of network pathways and in a second mode of operation of the second circuit contributing to the provisioning of the common voltage based on input signals of a second polarity received from the second pair of pathways;

supplying local power; and providing power and communication signals from additional network pathways.

63. The method as in claim 62 wherein local power comprises AC power.

64. The method as in claim 62 wherein the communication signals comprise voice signals.

65. The method as in claim 62 wherein the communication signals comprise data signals.

66. The method as in claim 62 wherein the first polarity is a positive polarity and the second polarity is a negative polarity.

67. The method as in claim 62 wherein the first polarity is a negative polarity and the second polarity is a positive polarity.

68. The method as in claim 62 wherein the first, second and additional pathways comprise LAN cable wires.

69. The method as in claim 62 wherein the first, second and additional pathways comprise terminal connections.

* * * * *